(12) United States Patent
Gouch

(10) Patent No.: US 7,760,957 B2
(45) Date of Patent: Jul. 20, 2010

(54) SHARPNESS ENHANCEMENT

(75) Inventor: Martin Philip Gouch, Herts (GB)

(73) Assignee: FFEI Limited, Hertfordshire (GB)

( * ) Notice: Subject to any disclaimer, the term of this patent is extended or adjusted under 35 U.S.C. 154(b) by 1123 days.

(21) Appl. No.: 11/374,171

(22) Filed: Mar. 14, 2006

(65) Prior Publication Data

US 2006/0215168 A1 Sep. 28, 2006

(30) Foreign Application Priority Data

Mar. 14, 2005 (GB) .................. 0505233.7
May 27, 2005 (GB) .................. 0510929.3

(51) Int. Cl.
 G06K 9/40 (2006.01)
 G06K 9/00 (2006.01)
 H04N 1/46 (2006.01)

(52) U.S. Cl. ............ 382/254; 382/262; 382/128; 358/532

(58) Field of Classification Search ............ 382/254, 382/255, 262, 263, 270, 274, 275, 128, 100; 359/626, 656; 358/532
See application file for complete search history.

(56) References Cited

U.S. PATENT DOCUMENTS

| 5,798,870 A | * | 8/1998 | Mizusawa | 359/659 |
| 6,674,903 B1 | | 1/2004 | Cliquet | |
| 6,842,297 B2 | * | 1/2005 | Dowski, Jr. | 359/724 |
| 7,336,430 B2 | * | 2/2008 | George et al. | 359/708 |

OTHER PUBLICATIONS

P. Magain et al.; "Deconvolution With Correct Sampling"; The Astrophysical Journal; No. 494; Feb. 10, 1998; pp. 472-477.
Peyman Milanfar; "A Tutorial on Image Restoration"; UCSC; Electrical Engineering Department and CfAO; Aug. 2003; pp. 1-19.

* cited by examiner

*Primary Examiner*—Yon Couso
(74) *Attorney, Agent, or Firm*—Sughrue Mion, PLLC

(57) ABSTRACT

A method of enhancing the sharpness of spatial frequencies in a digital image obtained by a digital imaging system. The method comprising modifying digital data defining the pixel content of the image so as to replace the spatial frequency characteristics of the digital image due to the digital imaging system with spatial frequency characteristics of an image produced by a microscope.

17 Claims, 9 Drawing Sheets

SHARPNESS ENHANCEMENT

FIELD OF THE INVENTION

The invention relates to methods for enhancing the sharpness of a digital image obtained by a digital imaging system.

DESCRIPTION OF THE PRIOR ART

Images of items which have been digitised with the use of a microscope or imaging apparatus such as a virtual microscope scanner have suffered a number of degradation effects. These include the loss in sharpness caused by the imaging system. This is due to components having a non-uniform frequency response. These components include those such as the lens, the detector's pixel size and any electronics bandwidth effect. Examples of this are shown in FIGS. 1 and 2 and a typical overall response is shown in FIG. 3. It is common to call these responses Modulation Transfer Functions (MTF).

It is standard practice with digitised images to sharpen them so the images look more pleasing. In the case of photographic or graphics arts use this sharpening is designed to produce a more visually pleasing image. Unfortunately, in the case of microscopic or medical images which are normally viewed in a microscope, these look artificial and have forced sharpness.

In the case of digitised images for scientific use, it is usual to decorrelate the Point Spread Function (PSF) of the image forming mechanism with the image and reconstruct the image without the blurring effects that the image capturing equipment produce. There are many ways of doing this and the theory for this is detailed in many standard texts such as Janson et al: Deconvolution of Images and Spectra, Academic Press. The basics though are based upon the theory that the image digitisation process acts as a blurring function, often called the Point Spread Function. Thus, the digitised image can be expressed mathematically as $$g = H \otimes f + n \quad (1)$$

where g=digitised image
H=Blurring function or PSF
f=original image
n=noise generated in process
$\otimes$=the two dimensional convolution So it is normal to simply invert the equation to produce a resulting image which is a process known as deconvolution. Since the convolution is simply a multiply operation in fourier space and the deconvolution is a divide in fourier space, this is normally performed in fourier space.

$$f = (g-n) \circ\circ H \quad (2)$$

where $\circ\circ$=the two dimensional deconvolution

Unfortunately, after this very scientific correction process, the images still look very artificial. Whilst they may be useful for analysis of the image by a program, it is not considered acceptable for viewing of images and diagnosing images by humans.

SUMMARY OF THE INVENTION

In accordance with the present invention, a method of enhancing the sharpness of a digital image obtained by a digital imaging system comprises modifying digital data defining the pixel content of the image so as to replace the spatial frequency characteristics of the digital image due to the digital imaging system with spatial frequency characteristics of an image produced by an (optical) microscope.

The inventor recognised that images obtained from microscopes are always viewed through a microscope and thus this will itself impart blurring on the viewed image.

Thus what is classed as natural images are in fact blurred images. To produce images which look natural, it is not necessary to correct to a completely unblurred original image but to produce an image that has been blurred in the same way as the image is normally seen.

The enhancement could be carried out in the spatial domain, the modifying step comprising deconvolving the digital data from the point spread function of the digital imaging system and convolving the resultant with the point spread function of the optical microscope. It is more convenient, from a computational point of view, however, to carry out the modifying step in the frequency domain in which case it will typically comprise multiplying a Fourier Transform of the digital data with the ratio of the Fourier Transform of the point spread function of the microscope and the Fourier Transform of the point spread function of the digital imaging system.

Typically, the digital imaging system will include a microscope but this need not be the same microscope whose spatial frequency characteristics are used to replace those of the digital imaging system.

In that connection, in a preferred aspect, the method further comprises storing the frequency response or modulation transfer function of the digital imaging system in association with the digital data defining the image obtained using the digital imaging system.

In addition to enhancing the sharpness of the image, the method may also include colour enhancements as will be described below.

BRIEF DESCRIPTION OF THE DRAWINGS

Some examples of methods of the invention will now be described with reference to the accompanying drawings, in which.

DETAILED DESCRIPTION OF THE EMBODIMENTS

Figure 1:
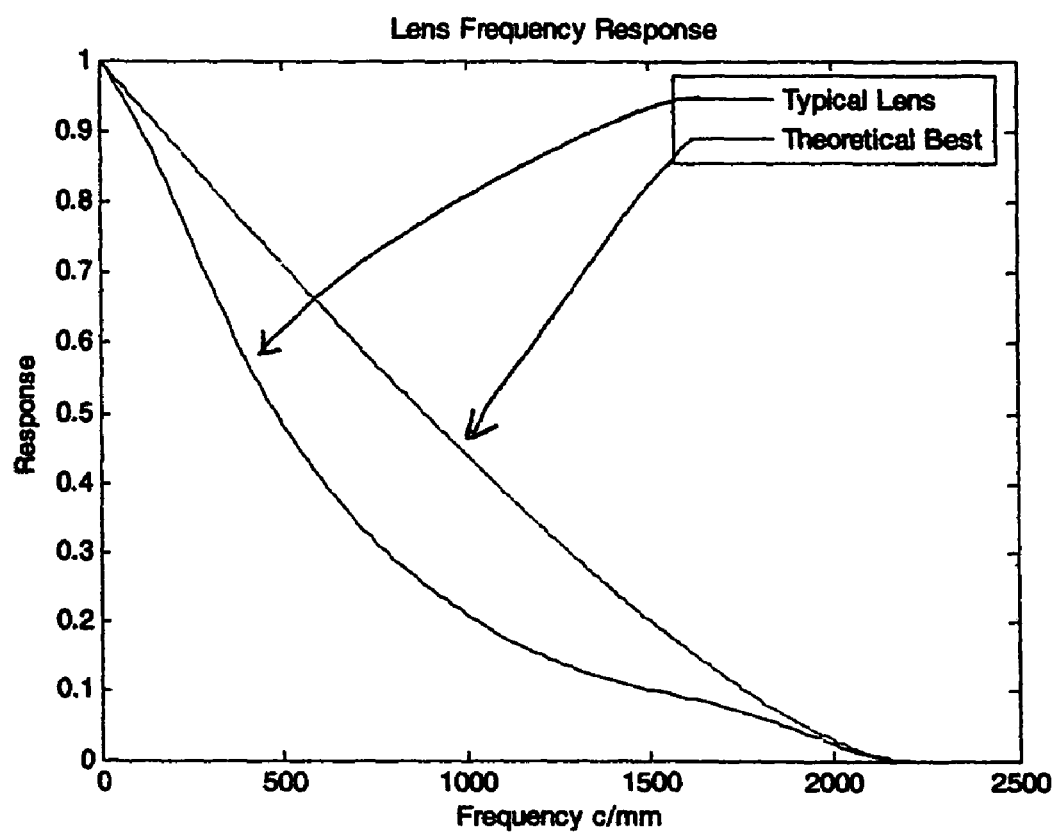
FIG. 1 illustrates the modulation transfer functions for a typical lens and a theoretical lens.
Figure 2:
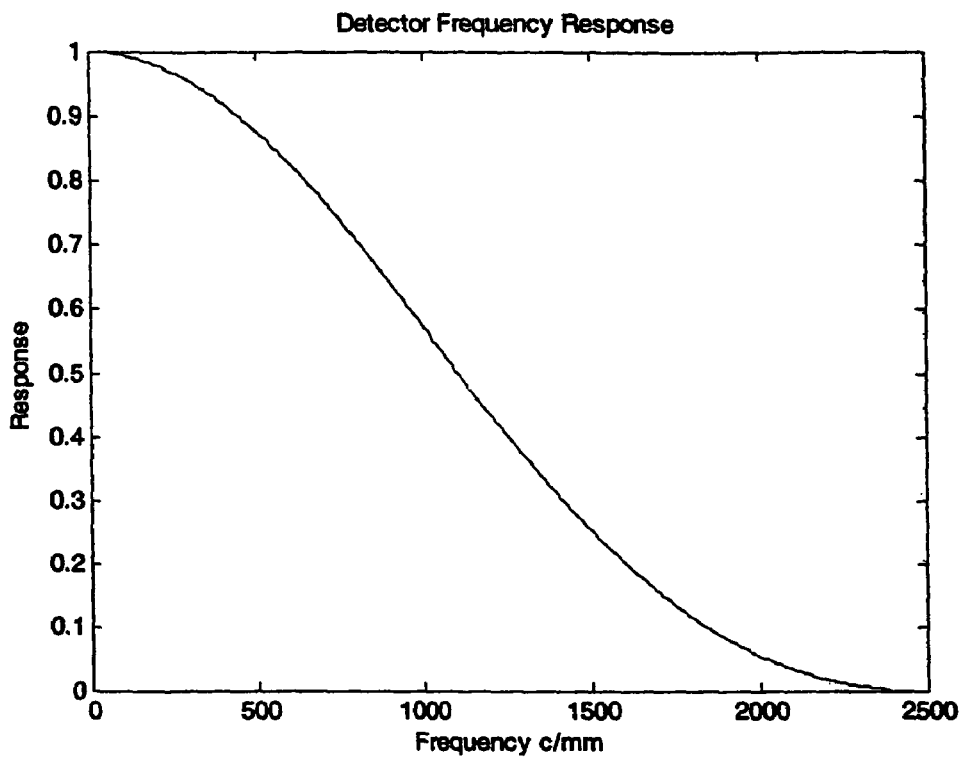
FIG. 2 illustrates the modulation transfer function of a conventional optical detector.
Figure 3:
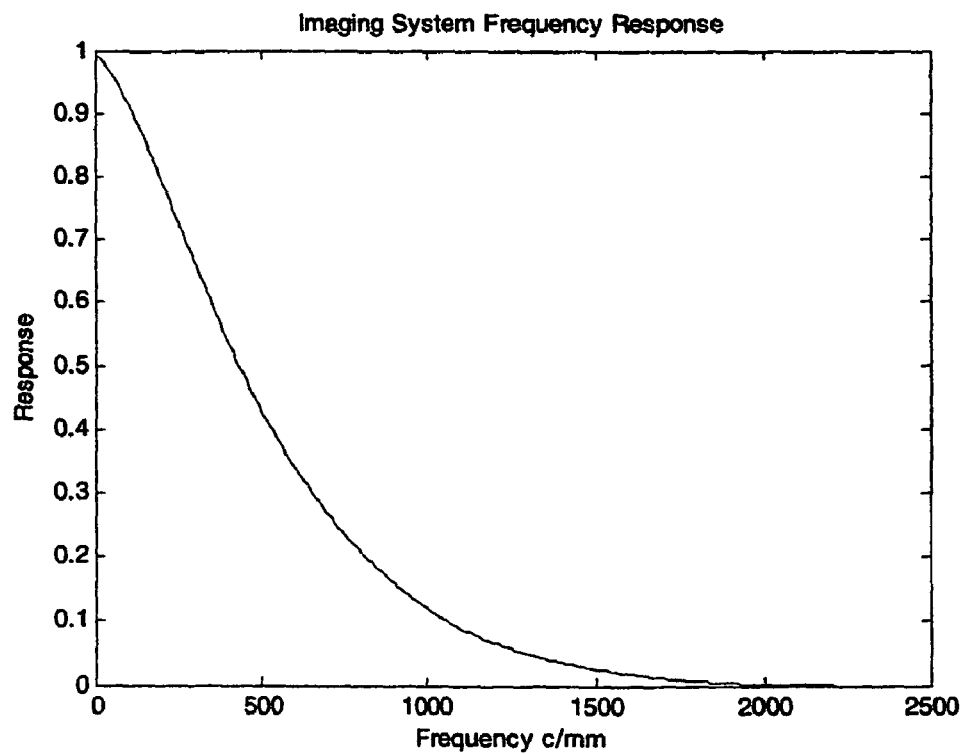
FIG. 3 illustrates the modulation transfer function of an imaging system.
Figure 4:
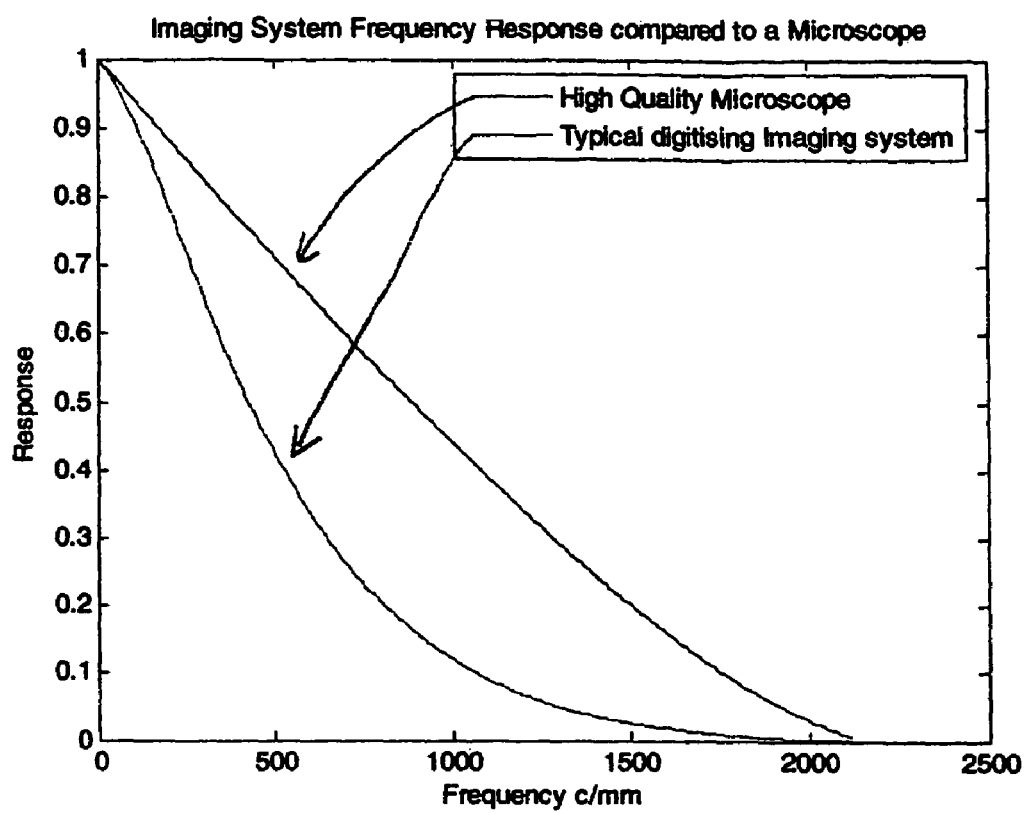
FIG. 4 shows a typical MTF for a high quality microscope and for an image digitising system.

FIG. 4 shows a typical MTF for a high quality microscope based on the theoretical response described in Born and Wolf, "Principles of Optics: Electromagnetic Theory of Propagation, Interference and Diffraction of Light", Pergamon Press, Fifth Edition, 1975, Chapter 9, compared with the typical MTF of an image digitising system such as described in U.S. Pat. No. 5,798,870. This shows the improvement in the image digitising system required to give good natural images.

This can be expressed mathematically by $$d = ((g-n) \circ \circ H) \otimes \otimes P \quad (3)$$

where d=desired image
H=blurring function for digital imaging system
P=Point Spread function of the microscope
If we recast equation 3 into fourier space $$\Pi d = \Pi(g-n) \cdot \frac{\Pi P}{\Pi H} \quad (4)$$

Where π denotes the Fourier Transform

From equation 4, it can be seen that if we operate in Fourier space all we need is what is known as a Fourier filter to get to the desired image. A Fourier filter is a mathematical frequency filter like a FIR filter. A signal is converted from the spatial domain into frequency space by a Fourier transform and the frequencies modulated, usually by multiplication, and then converted back to spatial domain with the inverse Fourier transform. See, for example, Bracewell, "The Fourier Transform and its applications", McGraw-Hill, Second Edition, 1978, Chapter 9.

Figure 5:
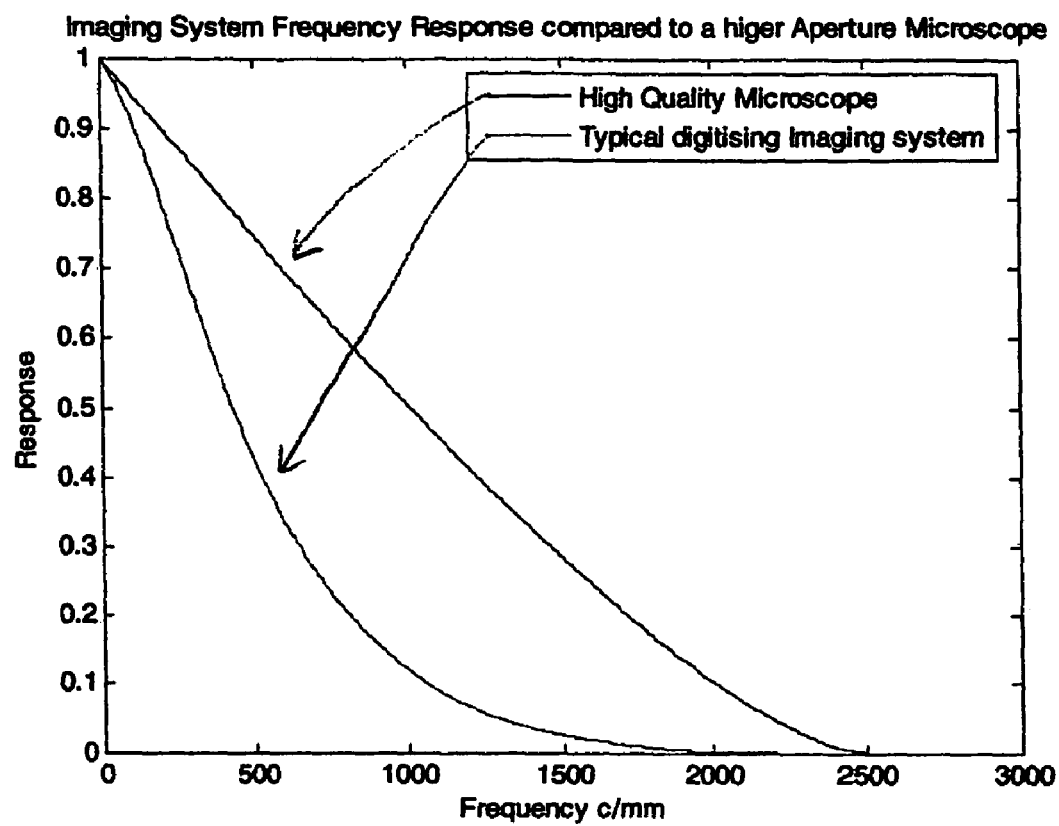
FIG. 5 illustrates the MTF for an imaging system as compared with a higher aperture microscope.

In addition, it should be noted that the Point Spread Function is related to the Optical Transfer Function in that one is the two dimensional transform of the other. The Modulation Transfer function is related to the amplitude of the Optical Transfer Function. Point Spread Functions and Optical Transfer Functions technically have a phase component but with in focus well corrected optical systems which are normally used the phase component is negligible and as such the Point Spread Function is the Fourier Transform of the Modulation Transfer Function and can be substituted directly in equation 4.

$$\Pi d = \Pi(g-n) \cdot \frac{M_o}{M_i} \quad (5)$$

where $M_o$=Modulation Transfer Function of the optical system we wish to simulate
$M_i$=Modulation Transfer Function of the digital imaging system Not only is this method capable of simulating a perfectly corrected optical system of broadly the same numerical aperture but we can also broadly simulate an optical system of greater numerical aperture as can be seen in FIG. 5. Thus, we simulate a system of greater capability than the digitising system.

The correction required ($M_o/M_i$) is then the division of the MTF's of the desired system by the actual system.

Figure 6:
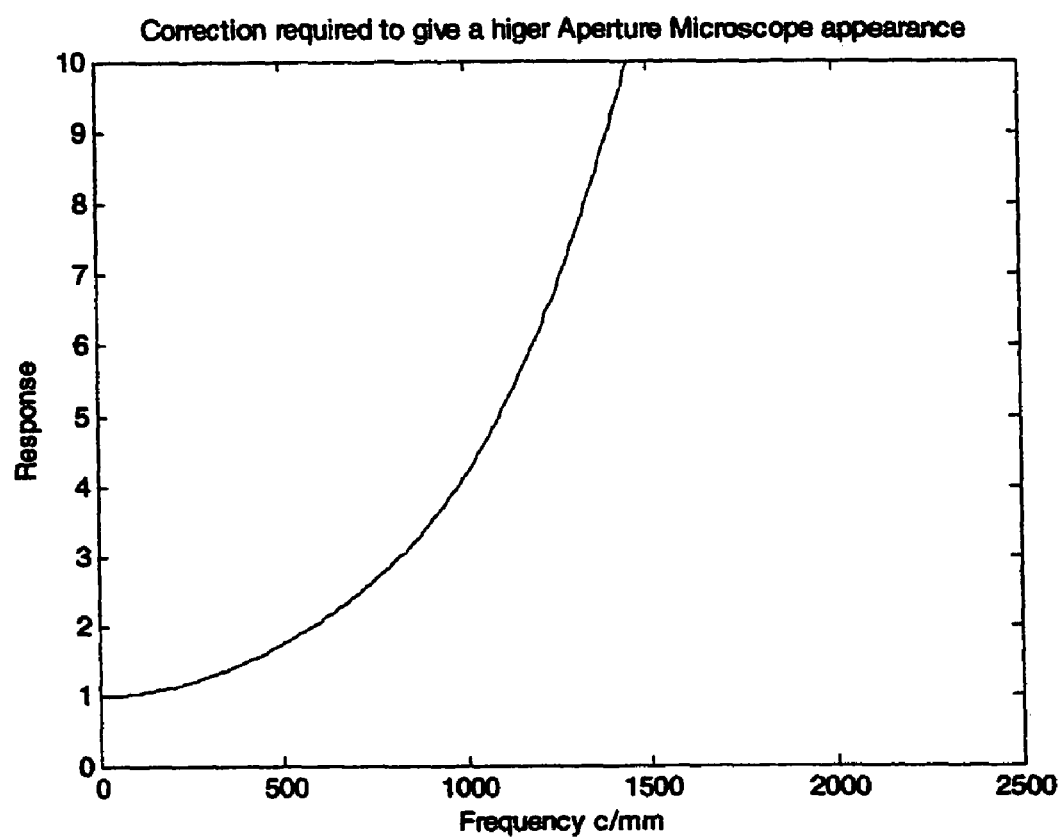
FIG. 6 illustrates the result of dividing the modulation transfer functions of FIG. 5.

Unfortunately, this can give very strong frequency boosts as can be seen in FIG. 6.

Figure 7:
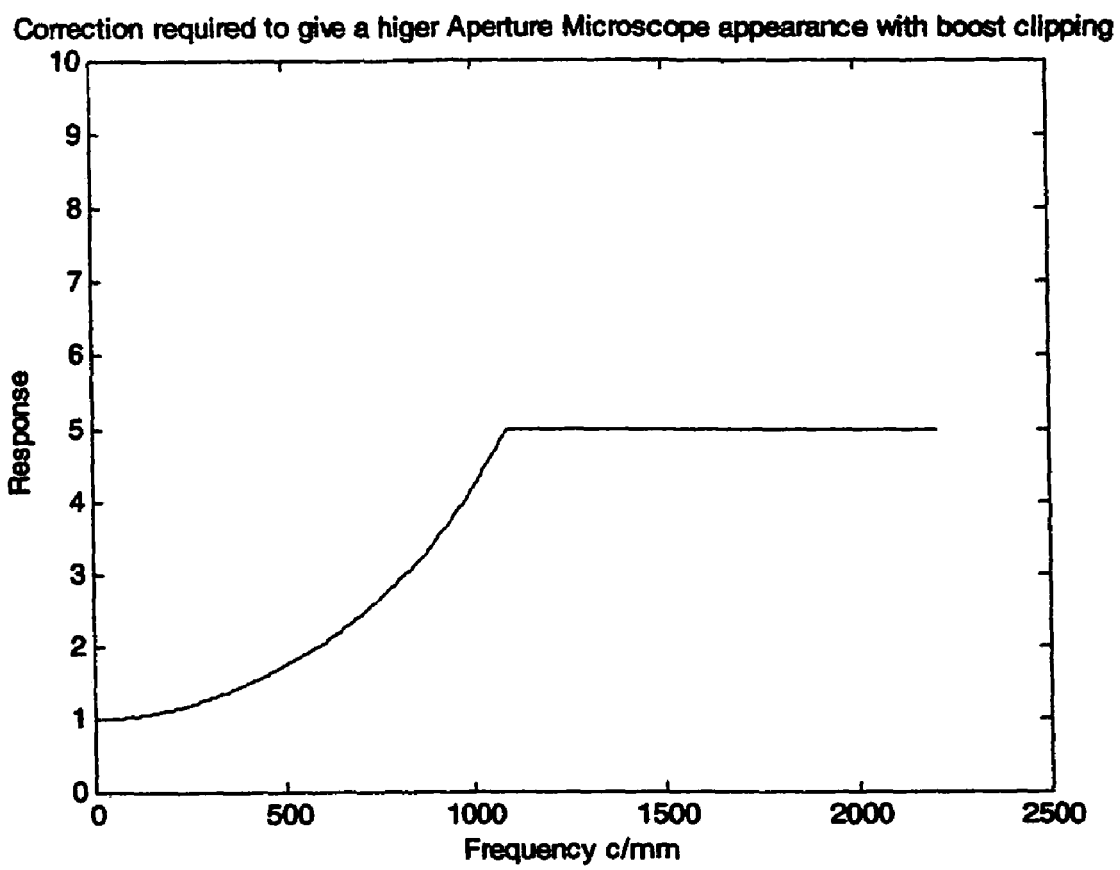
FIG. 7 is a view similar to FIG. 6 but illustrating the effect of boost clipping.

Strong frequency boosts are not desirable as digitisation artifacts become apparent in the image and the noise in the image becomes enhanced to the point where it is objectionable. Thus, we need a method to control this. A simple method of doing this is simply to set a limit on the magnitude of the boost permitted as can be seen in FIG. 7.

Figure 8:
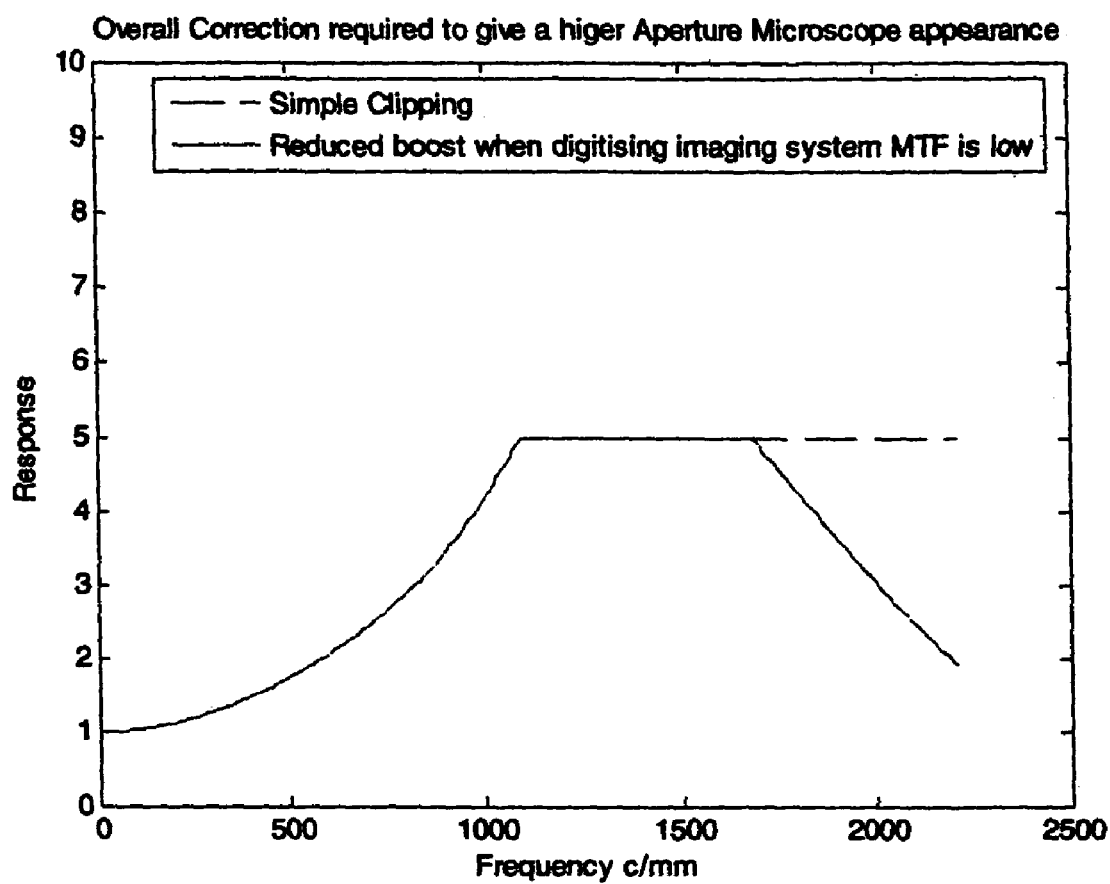
FIG. 8 is a view similar to FIG. 7 but illustrating reducing the boost when the MTF of the digitising imaging system is low.

One of the advantages with this method is that it is tolerant to the noise in the digital image as we are not applying strong boosts that enhance the noise. The other advantage is that it is known where the strength of the signal is poor in relation to the noise levels. That is where the MTF of the digitising imaging system is comparable to the noise which is where it is low. That is, it is predeterminable so can be permanently built into the correction rather than estimated from the image detail. To prevent over amplification of noise in relation to the signal strength, it is possible to ramp the gain down in the area where the digitising imaging system MTF is low as can be seen in FIG. 8.

Thus, all we need to do is to maintain the MTF or PSF of the digitising imaging system and we can generate the correction function based upon a knowledge of the MTF or PSF of the desired imaging system.

The above discussion assumes that the MTF is constant across the field of view. In practice, this is not always true. A method for dealing with this is as follows:

For a number of points across the field of view calculate the desired correction Mo/Mi.

Then for the centre of the field of view to be displayed calculate the desired correction by taking a linear interpolation from the known points surrounding the centre of the field of view.

Then apply the boost limits and gain ramp as shown in FIGS. 7 and 8.

It will be seen that the interpolation precedes application of the boost limits.

Furthermore, the process is not carried out on the whole image but typically only within the field of view. This allows the computations to be performed "on the fly" as the operator is selecting and viewing a previously digitised image.

Although we have described this processing in terms of a Fourier filter, it is possible to do exactly the same processing using a finite impulse response filter (FIR). In this case, the weights of the filter need to be adjusted to give to desired filter response previously calculated. There are many well documented techniques for determining the weights of the filter in relation to the desired frequency response.

We have described the PSF or MTF as a two dimensional function but it is not essential to store this data as a two dimensional function. It is also possible to store two orthogonal directions only and regenerate the two dimensional function as high quality imaging systems are well behaved and generally retain a significant amount of rotational symmetry.

This ability to store the MTF of the capture system means that if this information is provided with the image, it is possible at the time of displaying the image to select the microscope type system that it is required to simulate. That is, if the user is used to using one particular numerical aperture microscope, it is possible to simulate that microscope rather than a standard microscope.

The digital image is usually defined by multiple colour components e.g. Red. Green and Blue. In this case, it is also possible to produce much of the sharpening effect by enhancing only the green channel if the images are only to be viewed. This is because the eye's spatial response has a colour sensitivity response which is similar to the photopic response curve. Thus, if very rapid enhancement is required only the green channel needs enhancing. If more processing time is available then enhancing the red channel gives slightly more enhancement. Finally, if even more time processing time is available then the blue channel can be processed.

Figure 9:
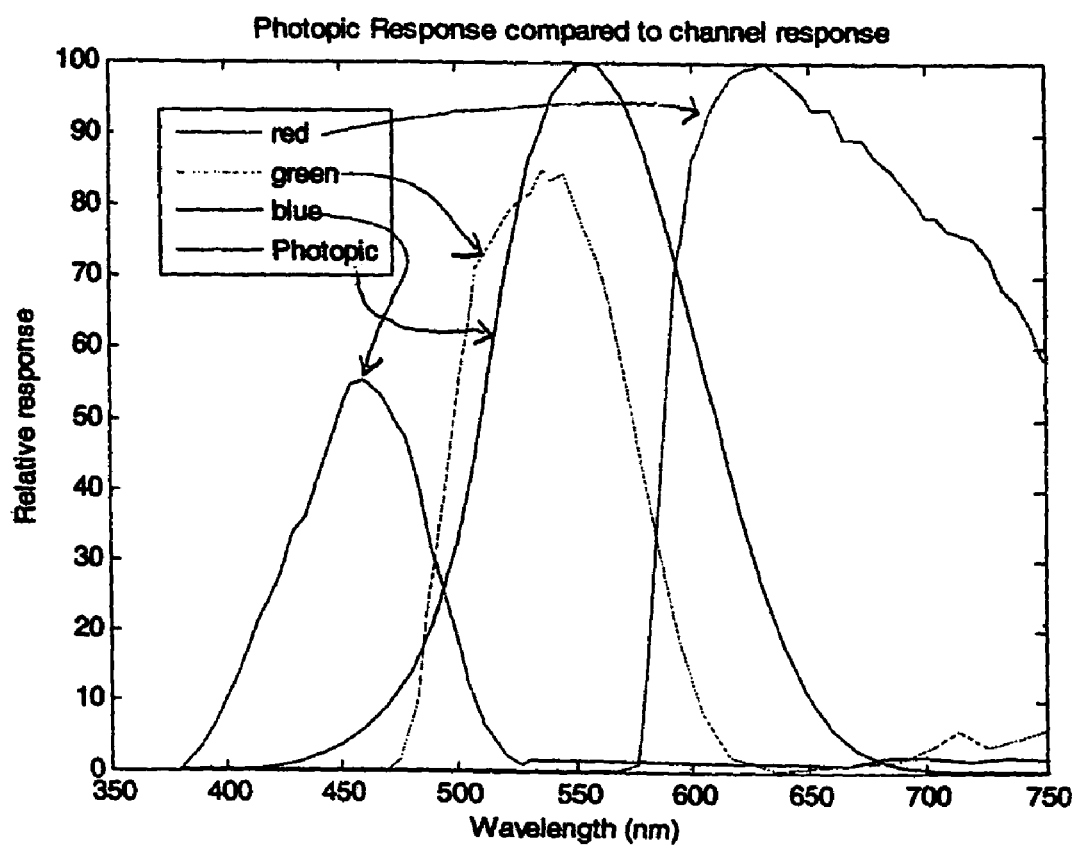
FIG. 9 illustrates the relative spectral responses of the human photopic response with the spectral responses of a typical RGB colour detector system; and, FIG. 10 is a block diagram of apparatus for carrying out the invention.

FIG. 9 illustrates the relative spectral responses of the human photopic response with the spectral responses of a typical RGB colour detector system. The photopic response is defined by the CIE as the CIE Photopic Luminous Efficiency Standard and it is the relative response to the power of light of the human eye under bright light conditions or when the cones are dominant in sensing light.

It is also possible to delay the colour processing and enhancement required for image viewing by using a colour profile to characterise the digitising imaging system. An example of such a system is an ICC profile as defined by the ICC at www.color.org. This can then be used with an output profile and a profile editor to display colours either accurately or in a way that enhances the image to help diagnosis such as tone boosting to show shadow details. Using this delayed processing method has the advantage of preserving as much detail as possible in the original image, enabling the user to view the image to examine the feature they are interested in in the best way possible such that the rendered image may lose detail in other areas of the image but as the original image has not been altered the other areas can be examined with a different enhancement feature.

Another advantage of this system is that some samples such as microscope slides of biological matter have stains in the biological matter to enhance the contrast of the sample. It is normal that this staining is slightly different from one location to another due to non-standardisation of the staining process. When slides are passed from one location to another for cross-checking purposes or second opinions, the second location will not be familiar with the level of staining that the first location used and will have to adjust to this staining difference. With the use of colour profiles, it is possible to adjust the staining of the image to that which the second location is used to seeing without changing the stored data by adjusting one of the colour profiles. This is done by adjusting the colour values of the colour profile.

Figure 10:
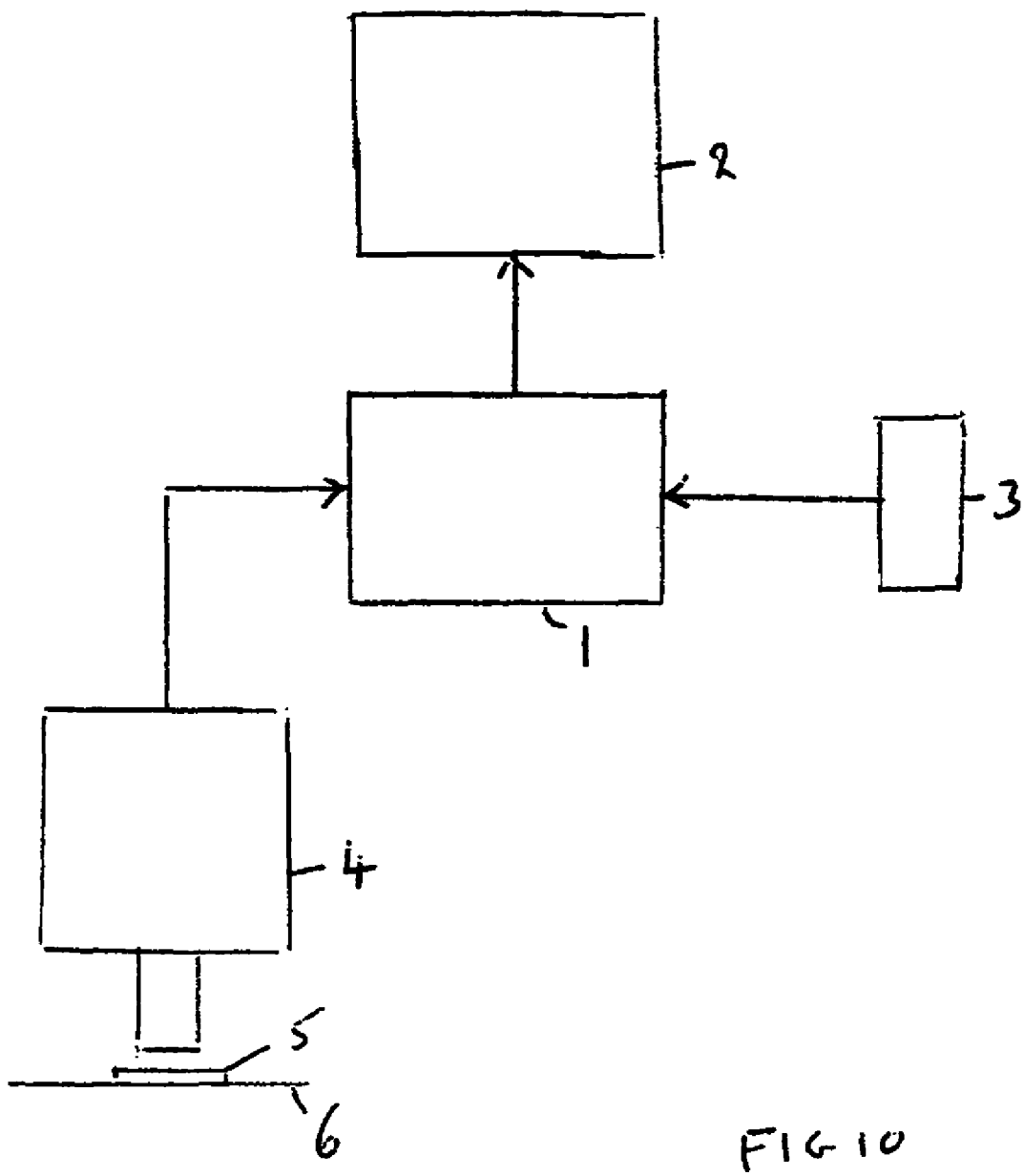

An example of apparatus for carrying out the invention is shown in FIG. 10. This comprises a central computer 1 coupled to a monitor 2 and an input device 3 such as a keyboard or mouse. A digital microscope 4 is also coupled to the computer 1 for generating a digital image of a sample, such as a biological sample, 5 mounted on a slide 6. The digital image will define individual pixels of the sample 5 in terms of colour components, typically three or four colour components, and this digital image will be modified in accordance with spatial frequency characteristics of the microscope, as explained above.

Initially, the user will view the image obtained by the digital microscope 4 on the monitor 2. If he wishes to view the appearance of the image of the sample 5 as it would have appeared if it had been obtained from an alternative microscope, the user indicates via the input device 3 to the computer 1 which microscope is desired. The computer 1 will then access the appropriate modifying algorithm from a store and modifies the digital data defining the pixel content so as to replace the spatial frequency characteristics due to the digital microscope 4 with spatial frequency characteristics of the selected microscope. This modified image will then be displayed on the monitor 2.

I claim:

1. A method of generating a resultant digital image by enhancing the sharpness of spatial frequencies in a first digital image obtained by a digital imaging system, the method comprising: in a single pass, modifying digital data defining the pixel content of the first digital image so as to replace the spatial frequency characteristics of the first digital image due to the digital imaging system with spatial frequency characteristics of an image produced by a microscope, and limiting the enhancement a) where the modulation transfer function of the digital imaging system falls below a first threshold and b) at frequencies above a second threshold.

2. A method according to claim 1, wherein the modifying step comprises deconvolving the digital data from the point spread function of the digital imaging system and convolving the resultant with the point spread function of the microscope.

3. A method according to claim 1, wherein the modifying step comprises multiplying a Fourier Transform of the digital data with the ratio of the Fourier Transform of the point spread function of the microscope and the Fourier Transform of the point spread function of the digital imaging system.

4. A method according to claim 1, further comprising determining the desired modification at more than one point across the field of view and averaging or interpolating the determined modifications to determine a final modification at the centre of the field of view.

5. A method according to claim 1, wherein the numerical aperture of the optical microscope is substantially equal to the numerical aperture of the digital imaging system.

6. A method according to claim 1, further comprising storing the frequency response or modulation transfer function of the digital imaging system in association with the digital data defining the image obtained using the digital imaging system.

7. A method according to claim 6, wherein the frequency response or modulation transfer function of the digital imaging system is stored as a 2D function.

8. A method according to claim 6, wherein the frequency response or modulation transfer function is stored as two 1D functions.

9. A method according to claim 1, wherein the digital data defines multiple colour component content of each pixel.

10. A method according to claim 9, wherein the enhancement is performed on only one or two of the colour components.

11. A method according to claim 10, wherein the enhancement is performed on only one of the colour components, preferably the green colour component.

12. A method according to claim 10, wherein the enhancement is performed on only two of the colour components, preferably the green and red colour components.

13. A method according to claim 1, wherein the digital image was obtained from a biological sample.

14. A method according to claim 1, wherein the modifying step is selected in accordance with a desired microscope.

15. A method according to claim 1, wherein the modifying step is implemented while viewing the digital image.

16. Apparatus for enhancing the sharpness of spatial frequencies in a digital image obtained by a digital imaging system, the apparatus comprising:

a processor configured to generate a resultant digital image by enhancing the sharpness of spatial frequencies in a first digital image obtained by a digital imaging system by, in a single pass, modifying digital data defining the pixel content of the first digital image so as to replace the spatial frequency characteristics of the first digital image due to the digital imaging system with spatial frequency characteristics of an image produced by a microscope, and limiting the enhancement a) where the modulation transfer function of the digital imaging system falls below a first threshold and b) at frequencies above a second threshold; and a display for displaying the resultant digital image.

17. A method of generating a resultant digital image, the method comprising:

obtaining, by a digital imaging system, a first digital image;

enhancing, by a processor, sharpness of spatial frequencies in the first digital image by, in a single pass, modifying, digital data defining pixel content of the first digital image so as to replace spatial frequency characteristics of the first digital image due to the digital imaging system with spatial frequency characteristics of an image produced by a microscope, and limiting, by the processor, the enhancement a) where the modulation transfer function of the digital imaging system falls below a first threshold and b) at frequencies above a second threshold.

* * * * *